(12) United States Patent
Heo et al.

(10) Patent No.: US 12,393,789 B2
(45) Date of Patent: Aug. 19, 2025

(54) METHOD AND APPARATUS FOR GENERATING LANGUAGE MODEL USING CROSSMODAL INFORMATION

(71) Applicant: ELECTRONICS AND TELECOMMUNICATIONS RESEARCH INSTITUTE, Daejeon (KR)

(72) Inventors: Jeong Heo, Daejeon (KR); Young-Ae Seo, Daejeon (KR); Jin Seong, Daejeon (KR); Jong Hun Shin, Daejeon (KR); Ki Young Lee, Daejeon (KR); Soojong Lim, Daejeon (KR); Young Kil Kim, Daejeon (KR); Jihee Ryu, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 339 days.

(21) Appl. No.: 18/200,778

(22) Filed: May 23, 2023

(65) Prior Publication Data
US 2024/0176959 A1    May 30, 2024

(30) Foreign Application Priority Data
Nov. 29, 2022   (KR) .................. 10-2022-0162471

(51) Int. Cl.
G06F 17/00    (2019.01)
G06F 40/30    (2020.01)
(Continued)

(52) U.S. Cl.
CPC .............. *G06F 40/40* (2020.01); *G06F 40/30* (2020.01); *G06V 20/70* (2022.01)

(58) Field of Classification Search
None
See application file for complete search history.

(56) References Cited

U.S. PATENT DOCUMENTS 10,341,461 B2 *   7/2019   Moon ................. G06F 16/9535
10,504,010 B2 *   12/2019  Mao ....................... G06N 3/045
(Continued)

FOREIGN PATENT DOCUMENTS

KR   10-2022-0086318 A    6/2022
KR   10-2022-0121349 A    9/2022
KR      10-2458463 B1    10/2022

*Primary Examiner* — Satwant K Singh
(74) *Attorney, Agent, or Firm* — LRK PATENT LAW FIRM

(57) ABSTRACT

Provided is a method of generating a language model using crossmodal information. The method includes: receiving language-based first modality information and non-language-based second modality information; converting the first modality information into a first byte sequence; converting the second modality information into a second byte sequence; converting the first and second byte sequences into a first embedding vector and a second embedding vector by applying an embedding technique for each modality; generating semantic association information between first and second modality information by inputting the first and second embedding vectors to a crossmodal transformer; and learning the language model by setting the generated semantic association information as training data.

14 Claims, 7 Drawing Sheets

(51) Int. Cl.
    *G06F 40/40*    (2020.01)
    *G06V 20/70*    (2022.01)

(56) References Cited

U.S. PATENT DOCUMENTS

| | | |
|---|---|---|
| 10,929,612 B2 | 2/2021 | Jung et al. |
| 11,348,581 B2 * | 5/2022 | Choudhary ......... G06F 3/04883 |
| 2022/0027611 A1 * | 1/2022 | Yu ........................ G06N 3/045 |
| 2022/0245365 A1 * | 8/2022 | Meng ..................... G06F 40/44 |

* cited by examiner

METHOD AND APPARATUS FOR GENERATING LANGUAGE MODEL USING CROSSMODAL INFORMATION

CROSS-REFERENCE TO RELATED APPLICATION

This application claims priority to Korean Patent Application No. 10-2022-0162471, filed on Nov. 29, 2022, in the Korean Intellectual Property Office, the disclosure of which is incorporated herein by reference.

BACKGROUND

1. Field of the Invention

The present invention relates to a method and apparatus for generating a language model using crossmodal information.

2. Description of Related Art

With the development of artificial intelligence technology, natural language processing technology is also developing rapidly. Among various models for neural machine translation, the performance of natural language tasks has begun to show a tendency to improve dramatically with the release of transformers to which self attention and multi-head attention technologies are applied.

A bidirectional encoder representations from transformers (BERT) model using only an encoder block of a transformer has contributed greatly to the development of deep learning technology for natural language processing, and a generative pre-trained transformer 3 (GPT3) model using only a decoder block opened a new chapter in natural language generation by artificial intelligence with 175 billion parameters through learning on a huge corpus.

However, in the case of the existing language models, there is a limitation of a single modality that is learned using only text. Accordingly, when language ambiguity exists, a problem may occur in that a language model does not accurately understand the meaning.

SUMMARY OF THE INVENTION

The present invention provides a method and apparatus for generating a language model using crossmodal information that learns and generates the language model capable of accurately understanding linguistic meaning by converging various modality information together in order to overcome limitations such as semantic ambiguity in learning and using the language model using only existing single text-based modality.

However, the problems to be solved by the present invention are not limited to the problems described above, and other problems may be present.

The present invention provides a method and apparatus for generating a language model using crossmodal information that learns and generates the language model capable of accurately understanding linguistic meaning by converging various modality information together in order to overcome limitations such as semantic ambiguity in learning and using the language model using only existing single text-based modality.

However, the problems to be solved by the present invention are not limited to the problems described above, and other problems may be present.

According to an embodiment of the present invention, a method of generating a language model using crossmodal information includes: receiving language-based first modality information and non-language-based second modality information; converting the first modality information into a first byte sequence; converting the second modality information into a second byte sequence; converting the first and second byte sequences into a first embedding vector and a second embedding vector by applying an embedding technique for each modality; generating semantic association information between the first and second modality information by inputting the first and second embedding vectors to a crossmodal transformer; and learning the language model by setting the generated semantic association information as training data.

According to another embodiment of the present invention, an apparatus for generating a language model using crossmodal information, comprising: a communication unit configured to receive language-based first modality information and non-language-based second modality information; a memory configured to store a program for learning the language model based on semantic association information between the first and second modality information; and as the program stored in the memory is executed, a processor configured to convert the first and second modality information into first and second byte sequences, respectively, convert the first and second byte sequences into a first embedding vector and a second embedding vector by applying an embedding technique for each modality, generate semantic association information between first and second modality information by inputting the first and second embedding vectors to a crossmodal transformer, and learn the language model by setting the generated semantic association information as training data.

According to still another embodiment of the present invention, a computer program according to another aspect of the present invention for solving the above problems executes the method of generating a language model using crossmodal information and is stored in a computer-readable recording medium.

Other specific details of the invention are included in the detailed description and drawings.

DETAILED DESCRIPTION OF EXEMPLARY EMBODIMENTS

Figure 1:
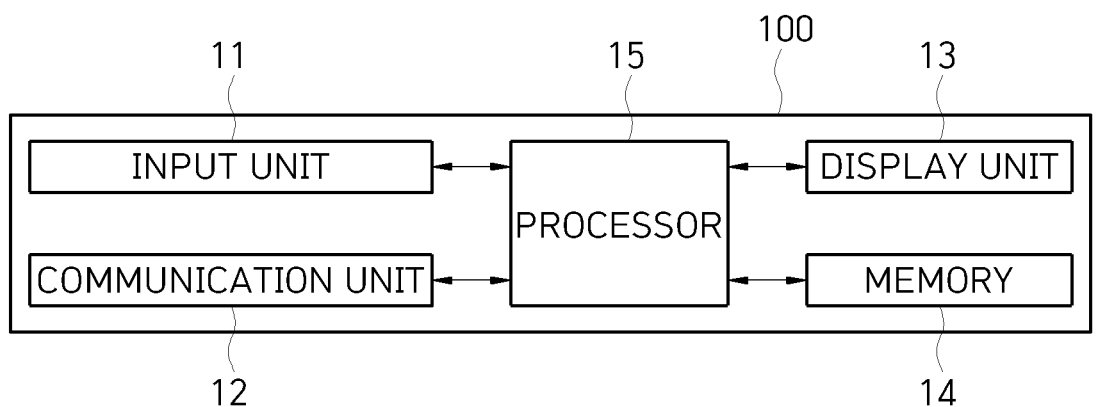
FIG. 1 is a block diagram of an apparatus for generating a language model according to an embodiment of the present invention.

Various advantages and features of the present invention and methods accomplishing them will become apparent from the following description of embodiments with reference to the accompanying drawings. However, the present disclosure is not limited to embodiments to be described below, but may be implemented in various different forms, these embodiments will be provided only in order to make the present disclosure complete and allow those skilled in the art to completely recognize the scope of the present disclosure, and the present disclosure will be defined by the scope of the claims.

Terms used in the present specification are for explaining embodiments rather than limiting the present disclosure. Unless otherwise stated, a singular form includes a plural form in the present specification. Throughout this specification, the term "comprise" and/or "comprising" will be understood to imply the inclusion of stated constituents but not the exclusion of any other constituents. Like reference numerals refer to like components throughout the specification and "and/or" includes each of the components mentioned and includes all combinations thereof. Although "first," "second," and the like are used to describe various components, it goes without saying that these components are not limited by these terms. These terms are used only to distinguish one component from other components. Therefore, it goes without saying that the first component mentioned below may be the second component within the technical scope of the present invention.

Unless defined otherwise, all terms (including technical and scientific terms) used in the present specification have the same meanings commonly understood by those skilled in the art to which the present invention pertains. In addition, terms defined in commonly used dictionary are not ideally or excessively interpreted unless explicitly defined otherwise.

The present invention relates to a method and apparatus 100 for generating a language model using crossmodal information.

Language is absolutely necessary to exchange and share various information among humans to form a consensus. In addition, it will be absolutely necessary for artificial intelligence (AI) to accurately understand human language in order to exchange information and form a consensus between humans and AI in the era of super-AI in the future. In order for AI to understand human language, various contextual information related to text should be considered. Therefore, in order to comprehensively judge and understand the situation based on various modality information, a language model using various modality information (image, voice, various sensing information, etc.) other than text information is essential.

In fact, when humans understand language, they do not understand the situation only with the text language itself, but may understand the precise meaning latent in text and conversation based on various modality information such as visual and auditory information around them.

For example, in a sentence "child is holding Bae." the meaning of "Bae" may not be accurately determined using only the text. However, when an image of a child eating a pear of fruit is presented together, the meaning of "Bae" may be accurately determined.

As such, when the text and image are presented together, the meaning of the text may be accurately understood, and an object of an embodiment of the present invention is to provide a language model for complex intelligence capable of comprehensive understanding based on various crossmodal information by developing a language model to accurately understand the meaning of the text with the help of various modality information.

In an embodiment of the present invention, the following three core functions are applied to a language model using various modality information.

First, a method of converting various modality information into the same input form is required. In this case, the most basic form of representing various mobility information may be a byte, and a token-free technology is required to receive a byte sequence for digital information of various modalities as an input.

Second, a technology for mapping from a byte sequence of input various modalities to a common semantic representation is required. To this end, cross attention information using a visual transformer may be utilized.

Thirdly, there is a method of learning common semantic representations for various modality information with a language model. In the case of the existing language model, the language model was learned with a task of predicting a masked vocabulary (masked language model) or predicting a semantic relationship between sentences (next sentence prediction). When various modality information is provided as input, how to learn a language model is an important factor in the performance of a language model.

The apparatus 100 for generating a language model using crossmodal information according to an embodiment of the present invention learns and generates the language model capable of accurately understanding linguistic meaning by converging various modality information together in order to overcome limitations such as semantic ambiguity in learning and using the language model using only existing single text-based modality.

Hereinafter, an apparatus for generating a language model using crossmodal information (hereinafter, an apparatus for generating a language model) according to an embodiment of the present invention will be described with reference to FIG. 1. FIG. 1 is a block diagram of the apparatus 100 for generating a language model according to an embodiment of the present invention.

The apparatus 100 for generating a language model according to an embodiment of the present invention includes an input unit 11, a communication unit 12, a display unit 13, a memory 14, and a processor 15.

The input unit 11 generates input data in response to a user input of the apparatus 100 for generating a language model. The user input may include a user input (e.g., text or image) related to data to be processed by the apparatus 100 for generating a language model.

The input unit 11 includes at least one input means. The input unit 11 may include a keyboard, a key pad, a dome switch, a touch panel, a touch key, a mouse, a menu button, and the like.

The communication unit 12 serves to transmit and receive data between internal components or communicate with an external device such as an external server. The communication unit 12 may include both a wired communication module and a wireless communication module. The wired communication module may be implemented as a power line communication device, a telephone line communication device, cable home (MoCA), Ethernet, IEEE1294, an integrated wired home network, and an RS-485 control device.

In addition, the wireless communication module may be configured in a module for implementing functions such as wireless LAN (WLAN), Bluetooth, HDR WPAN, UWB, ZigBee, Impulse Radio, 60 GHz WPAN, Binary-CDMA, wireless USB technology and wireless HDMI technology, 5th (5G) generation communication, long term evolution-advanced (LTE-A), long term evolution (LTE), and wireless fidelity (Wi-Fi).

The display unit 13 displays display data according to the operation of the apparatus for generating a language model 100. The display unit 13 may display modality information such as input text or image.

The display unit 13 may include a liquid crystal display (LCD), a light emitting diode (LED) display, an organic LED (OLED) display, a micro electro mechanical systems (MEMS) display, and an electronic paper display. The display unit 13 may be coupled with the input unit 11 and implemented as a touch screen.

The memory 14 stores programs for learning a language model based on semantic association information between modality information. Here, the memory 14 collectively refers to a non-volatile storage device that continuously maintains stored information even when power is not supplied and a volatile storage device. For example, the memory 14 may include NAND flash memories such as a compact flash (CF) card, a secure digital (SD) card, a memory stick, a solid-state drive (SSD), and a micro SD card, magnetic computer storage devices such as a hard disk drive (HDD), and optical disc drives such as CD-ROM and DVD-ROM.

The processor 15 may execute software such as a program to control at least one other component (e.g., hardware or software component) of the apparatus 100 for generating a language model 100, and may perform various data processing or calculations.

The processor 15 may learn the language model by receiving the modality information to generate the semantic association information.

Hereinafter, a method of generating a language model performed by the apparatus 100 for generating a language model will be described with reference to FIGS. 2 to 8.

Figure 2:
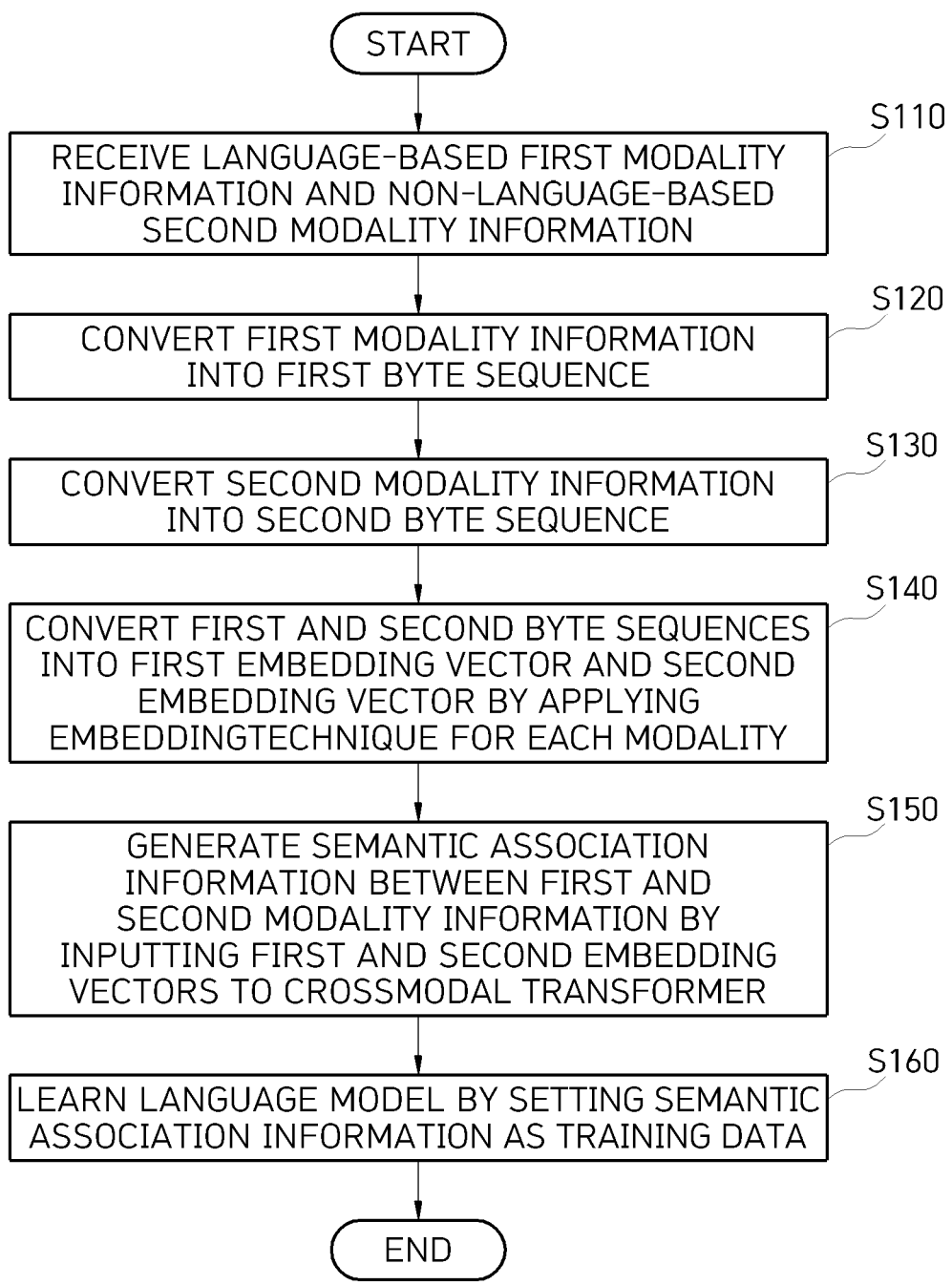
FIG. 2 is a flowchart of a method for generating a language model according to an embodiment of the present invention.

FIG. 2 is a block diagram of a method for generating a language model according to an embodiment of the present invention.

First, language-based first modality information 120 and non-language-based second modality information 110 are received (S110). As an embodiment, the second modality information 110 may be image-based modality information.

Figure 3:
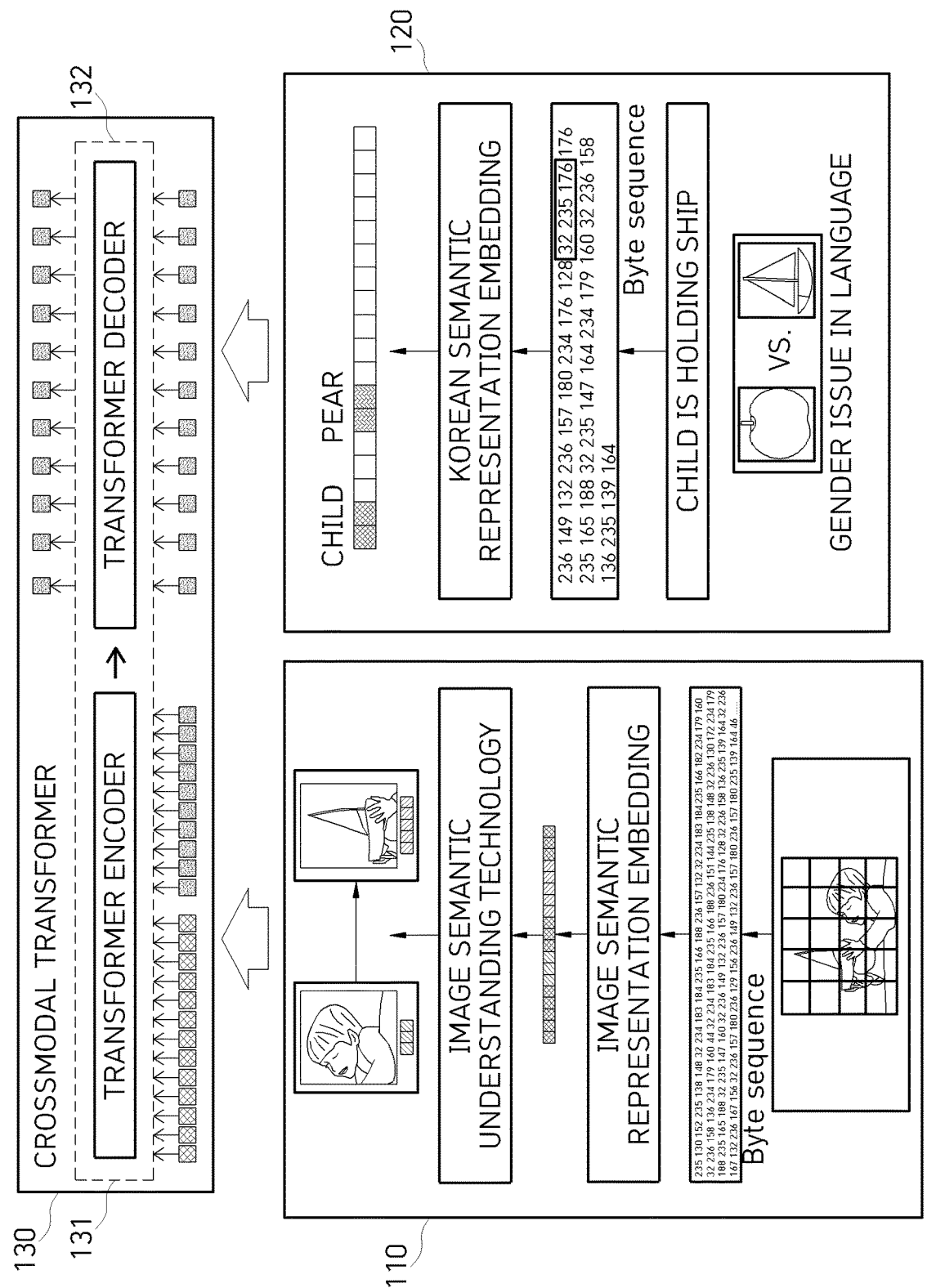
FIG. 3 is an exemplary diagram for describing a process of generating a language model using crossmodal information, which is image and text, in an embodiment of the present invention.

FIG. 3 is an exemplary diagram for describing a process of generating a language model using cross-modal information, which is image and text, in an embodiment of the present invention.

For example, in the sentence 120 "child is holding Bae," the "Bae" is a semantically ambiguous word. In other words, the "Bae" has semantic ambiguity as "pear" meaning fruit and "ship" meaning transportation means.

However, when "image of a child holding a toy sailboat" 110 is presented together, the meaning of the sentence "child is holding Bae" becomes clear. As such, when only the text information is used, it is often ambiguous that the meaning of the text may not be clearly interpreted. However, when the non-language-based second modality information 110 such as image information is used together, it is possible to learn and generate a language model that can understand meaning more accurately.

This is the same as the way humans understand language. Complex artificial intelligence, which interprets the meaning of language based on various information such as sight, hearing, and touch, is a key technology for general-purpose artificial intelligence.

Meanwhile, in order to develop the language model using various modality information, it is necessary to minimize the difference in the input unit between the modality information. For example, when an image uses an RGB value as input and text is a subword based on a vocabulary as input, various relational constraints between input information may occur. That is, in the case of text, an out of vocabulary (OOV) problem may occur in the case of a vocabulary that is not in the vocabulary.

In order to solve this problem, an embodiment of the present invention allows all inputs to be received as a byte sequence (byte sequence) regardless of modality. Accordingly, the input first modality information 120 is converted into a first byte sequence (S120), and the second modality information is converted into a second byte sequence 110 (S130). When the byte sequence-based input becomes possible, the problem of the OOV in the case of the text may be solved.

Next, the first and second byte sequences are converted into a first embedding vector and a second embedding vector by applying an embedding technique for each modality (S140).

That is, the input byte sequence should be converted into a vector through embedding for each modality, which may be utilized by borrowing various embedding methodologies for each modality.

As an embodiment, when the second modality information is an image, the converted second embedding vector is analyzed to extract relationship information between main objects included in the image, and a dimension of the second embedding vector may be reduced based on the relationship information. That is, a method of reducing a dimension of an embedding vector may be applied by applying an image semantic understanding technique for extracting relationship information between main images.

Similarly, when the modality information other than image and text is also vectorized by applying individual embedding technology, it can be applied to a language model using crossmodal information according to the present invention.

Next, the first and second embedding vectors 110 and 120 are input to the crossmodal transformer 130 to generate semantic association information between the first and second modality information (S150), and the generated semantic association information is used as training data to learn a language model (S160).

Figure 4:
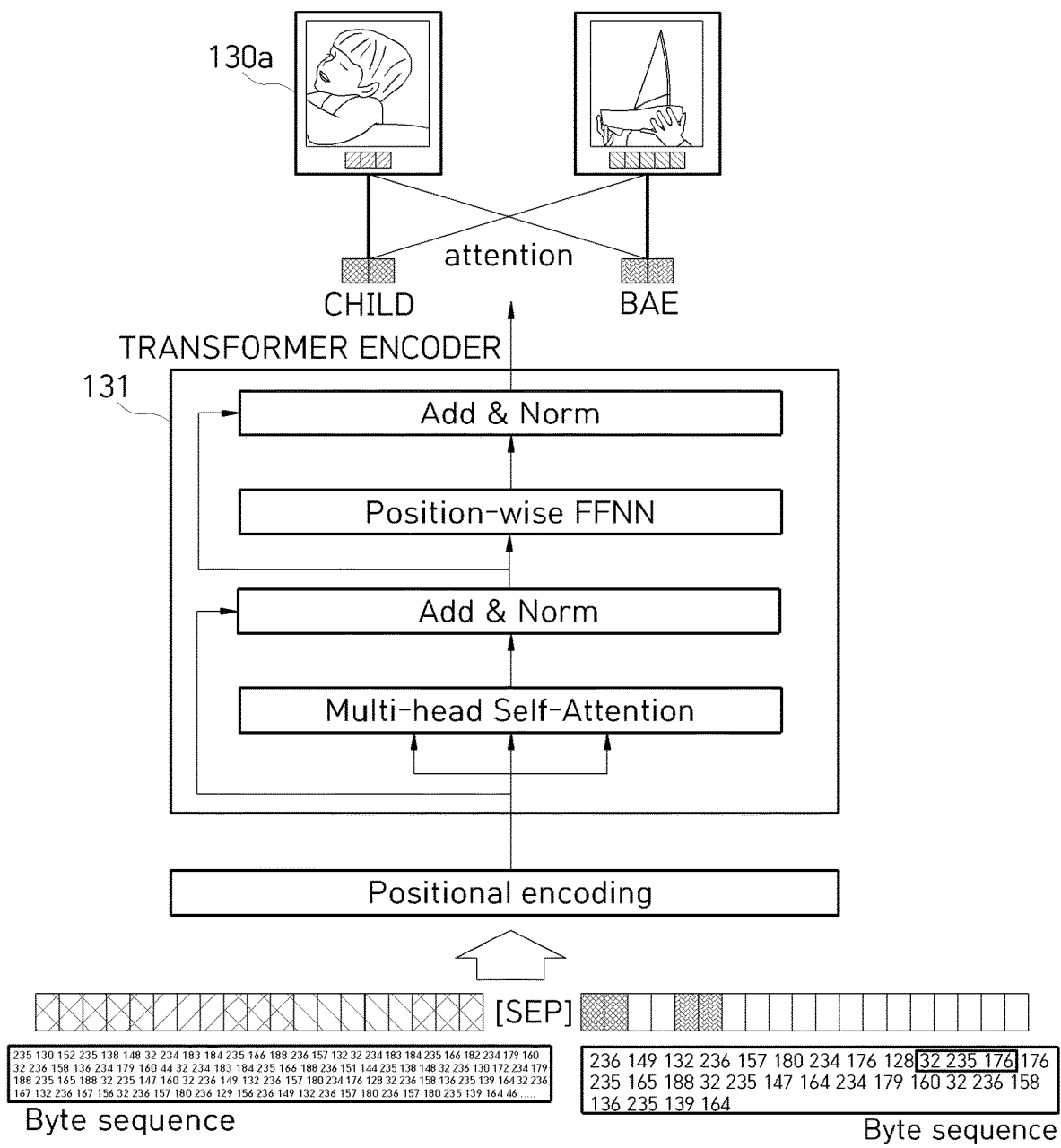
FIG. 4 is a diagram illustrating an example of using an encoder of a crossmodal transformer in an embodiment of the present invention.

FIG. 4 is a diagram illustrating an example of using an encoder 131 of a crossmodal transformer in an embodiment of the present invention.

As an embodiment, the encoder 131 of the crossmodal transformer may generate the semantic association information matched between the first and second embedding vectors for each token unit.

The encoder 131 of the crossmodal transformer may analyze the relationship between input tokens based on self-attention. Therefore, when the embedding vector for the byte sequence of the text "image of a child holding a toy sailboat" and the text "child is holding Bae" is input to the encoder, the image part corresponding to <child> and the vocabulary "child" is recognized as highly semantically related, and the image part corresponding to <toy sailboat> and "ship" may be recognized as highly semantically related (130*a*).

Figure 5:
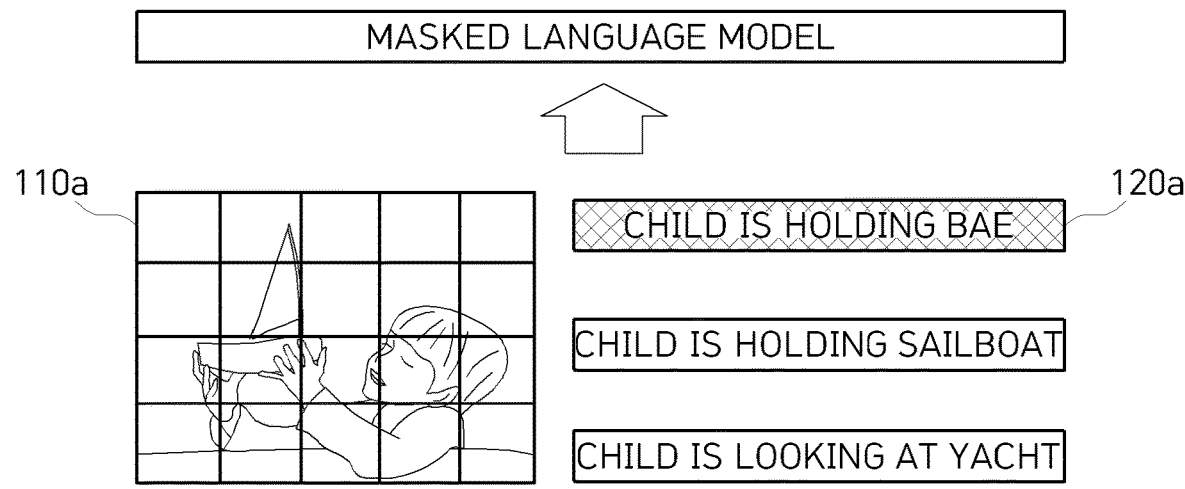
FIGS. 5 and 6 are diagrams for describing an embodiment of applying masking to a token included in text modality information.
Figure 6:
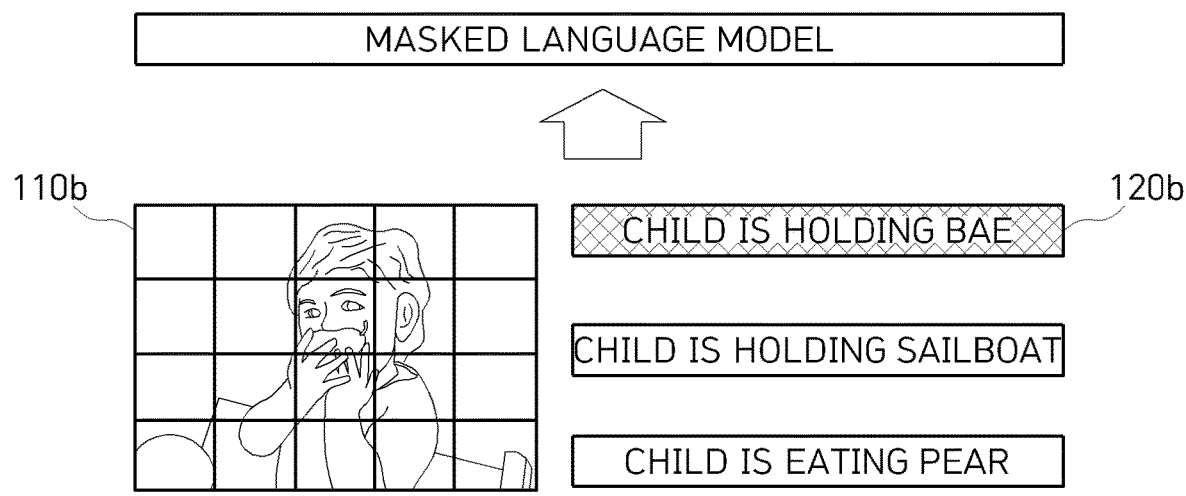

FIGS. 5 and 6 are diagrams for describing an embodiment of applying masking to a token included in text modality information.

As an embodiment, the present invention masks at least one token to be learned as a target by matching with the second modality information among a plurality of tokens included in the first modality information.

Next, at least one language-based third modality information including a token having a semantic relationship with the second modality information is collected, and the token having a semantic relationship in the third modality information is masked as a target.

Next, the semantic association information with the second modality information may be generated based on the first and third modality information including the masked token.

Referring to the examples of FIGS. 5 and 6, in the first modality information 120a and 120b which is the sentence "child is holding Bae," when the "Bae" is masked, and <An image of a child holding a toy sailboat> 110a and <An image of a child eating a pear of fruit> 110b are input as the second modality information, the correct answer of the masked token, "Bae" may be semantically uncertain.

In this case, in at least one language-based third modality information ("child is holding a sailboat" and "child is looking at a yacht," and "child is holding fruit" and "child is eating a pear") including tokens semantically related to other texts paired with individual images, that is, the second modality information, when learning is performed by masking "sailboat" and "yacht" 110a and learning is performed by masking "fruit" and "ship" 110b, the meaning of the masked token "Bae" in the text "child is holding Bae" may be clearly understood with the help of an image.

As such, in one embodiment of the present invention, a crossmodal language model for text (first modality information) and image (second modality information) collects various caption sentences (third modality information) for an image and formed in a pair of image and caption, and it is possible to learn through a prediction (masked language model) method by masking main entities. In this way, it is possible to learn and generate a language model in which the semantic ambiguity of text is resolved with the help of input images.

Figure 7:
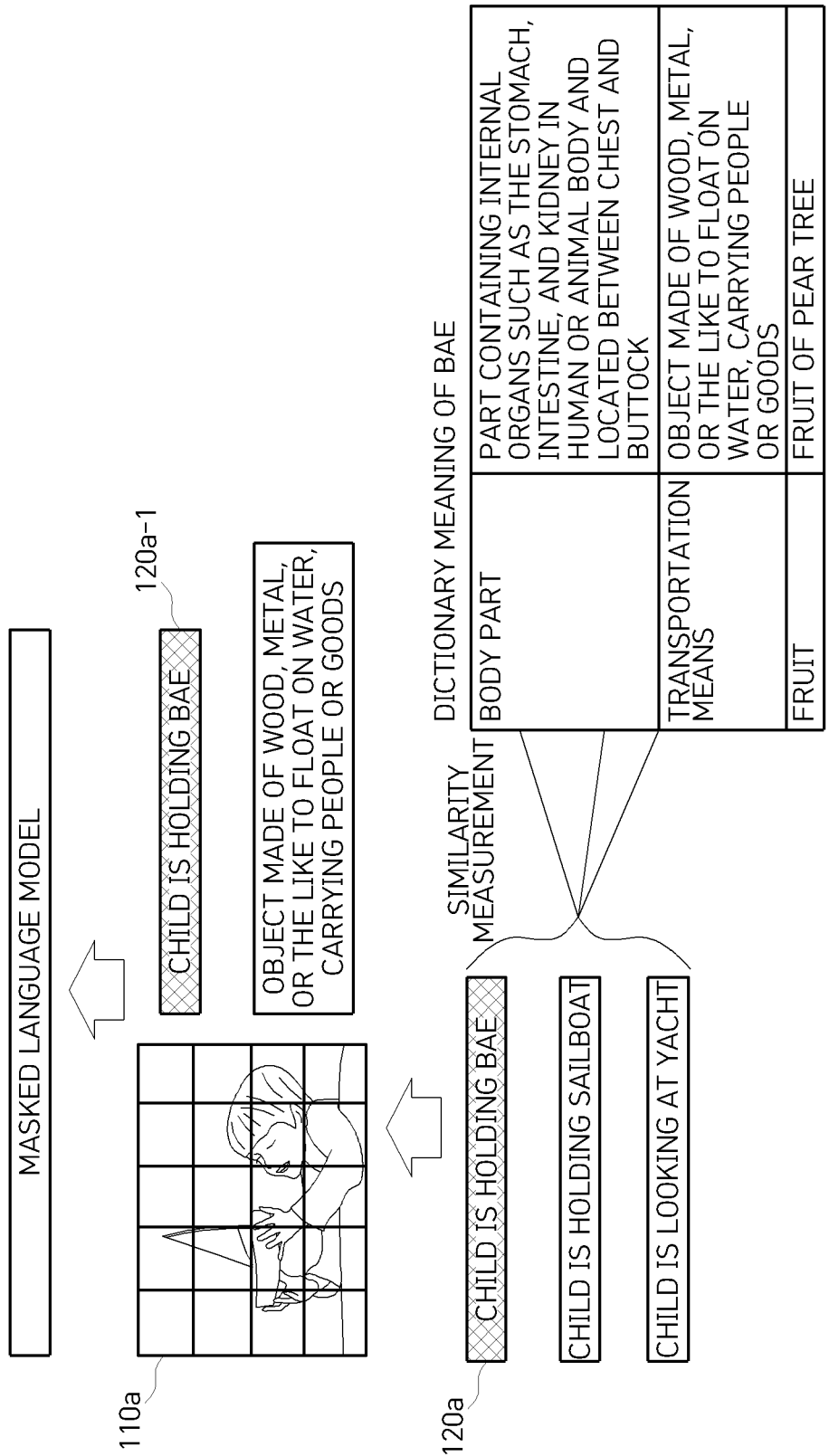
FIG. 7 is a diagram for describing an embodiment of learning a language model using dictionary information in an embodiment of the present invention.

FIG. 7 is a diagram for describing an embodiment of learning a language model using dictionary information in an embodiment of the present invention.

As an embodiment, the present invention may collect dictionary information corresponding to the masked token of the first modality information. In this case, the collected dictionary information may be collected by further considering the masked token of the above-described third modality information.

Next, a similarity between at least one semantic information included in the dictionary information and the masked token is calculated, and semantic information having the highest similarity among the semantic information included in the dictionary information may be included as training data for learning the language model.

FIG. 7 is a diagram for describing a method of adding semantic information by using a dictionary definition sentence in learning about "child is holding Bae" in FIG. 5.

In the sentence "child is holding Bae" 120a-1, the masked "Bae" is a semantically ambiguous word, and is also semantically ambiguous when only text sentences are considered. However, considering the image 110a that is input together, the meaning of the "Bae" may be understood by humans.

The "Bae" may have three meanings in the dictionary. Therefore, just as humans recognize the meaning of "Bae" through images, when the dictionary information of the masked "Bae" is additionally input and included in the training data, the language model will be able to better predict the meaning of the masked "Bae."

To this end, the embodiment of the present invention may automatically select the semantic information included in the dictionary information corresponding to the masked token ("Bae") of the first modality information.

As a method of selecting semantic information, there is a similarity measurement method of selecting semantic information in a dictionary having the highest semantic similarity with captions 120a paired with the image 110a. For example, the similarity measurement may use a semantic similarity measurement method using a language model (frozen LM) such as the existing BERT or a symbolic similarity measurement method.

Meanwhile, in the embodiment of the present invention, semantic information having a similarity less than a preset threshold may be excluded from training data in order to remove noise.

As such, the embodiment of the present invention has an advantage in that it is possible to learn a language model helpful for linguistic reasoning by adding dictionary semantic information of a masked vocabulary to the language model learning.

Figure 8:
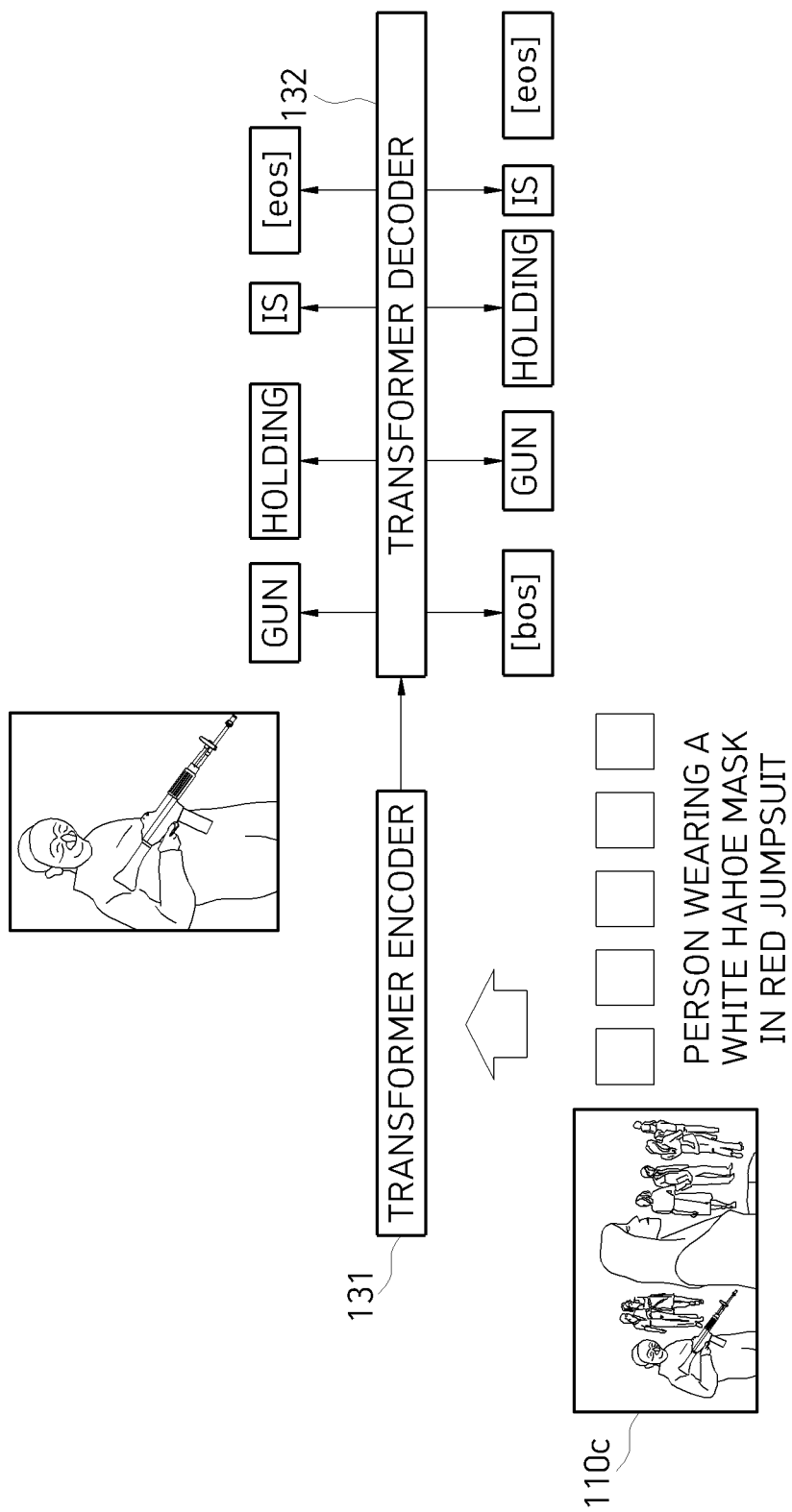
FIG. 8 is a diagram illustrating an application example of an embodiment of the present invention.

FIG. 8 is a diagram illustrating an application example of an embodiment of the present invention.

As in FIGS. 5 to 7, FIG. 8 is an exemplary view showing that an understanding-generating language model in which the masked language model learning has been performed using the image and text as inputs may provide accurate descriptions of images.

When the image is input to the learned language model, among various people wearing a red jumpsuit, a person wearing a white mask is accurately recognized (110c), and it is accurately understood that what the person is holding is a gun, the decoder 132 may generate the string "holding a gun."

As such, the embodiment of the present invention can generate a language model that may be utilized in various application fields such as image question answering and caption generation for images.

Meanwhile, in the above description, steps S110 to S160 may be further divided into additional steps or combined into fewer operations according to an implementation example of the present invention. Also, some steps may be omitted if necessary, and an order between the operations may be changed. In addition, other omitted contents may also be applied to the contents described in FIG. 1 and the contents described in FIGS. 2 to 8, respectively.

The method of generating a language model according to the embodiment of the present invention described above may be embodied as a program (or application) and stored in a medium for execution in combination with a computer which is hardware.

In order for the computer to read the program and execute the methods implemented as the program, the program may include a code coded in a computer language such as C, C++, JAVA, Ruby, or machine language that the processor (CPU) of the computer may read through a device interface of the computer. Such code may include functional code related to a function or such defining functions necessary for executing the methods and include an execution procedure related control code necessary for the processor of the computer to execute the functions according to a predetermined procedure. In addition, the code may further include a memory reference related code for which location (address street number) in an internal or external memory of the computer the additional information or media necessary for the processor of the computer to execute the functions is to be referenced at. In addition, when the processor of the computer needs to communicate with any other computers, servers, or the like located remotely in order to execute the above functions, the code may further include a communication-related code for how to communicate with any other computers, servers, or the like using the communication module of the computer, what information or media to transmit/receive during communication, and the like.

The storage medium is not a medium that stores images therein for a while, such as a register, a cache, a memory, or the like, but means a medium that semi-permanently stores the images therein and is readable by an apparatus. Specifically, examples of the storage medium include, but are not limited to, ROM, random-access memory (RAM), CD-ROM, a magnetic tape, a floppy disk, an optical image storage device, and the like. That is, the program may be stored in various recording media on various servers accessible by the computer or in various recording media on the computer of the user. In addition, media may be distributed in a computer system connected by a network, and a computer-readable code may be stored in a distributed manner.

According to an embodiment of the present invention, by training a deep neural network model as if transcription information exists for voice data without non-transcription, it is possible to acquire a pre-training model more suitable for a classifier in a pre-training step.

The effects of the present invention are not limited to the above-described effects, and other effects that are not mentioned may be obviously understood by those skilled in the art from the following description.

The above description of the present invention is for illustrative purposes, and those skilled in the art to which the present invention pertains will understand that it may be easily modified to other specific forms without changing the technical spirit or essential features of the present invention. Therefore, it should be understood that the above-mentioned exemplary embodiments are exemplary in all aspects but are not limited thereto. For example, each component described as a single type may be implemented in a distributed manner, and similarly, components described as distributed may be implemented in a combined form.

It is to be understood that the scope of the present invention will be defined by the claims rather than the above-described description and all modifications and alternations derived from the claims and their equivalents are included in the scope of the present invention.

What is claimed is:

1. A method of generating a language model using crossmodal information, comprising:
receiving language-based first modality information and non-language-based second modality information;
converting the first modality information into a first byte sequence;
converting the second modality information into a second byte sequence;
converting the first and second byte sequences into a first embedding vector and a second embedding vector by applying an embedding technique for each modality;
generating semantic association information between the first and second modality information by inputting the first and second embedding vectors to a crossmodal transformer; and
learning the language model by setting the generated semantic association information as training data.

2. The method of claim 1, wherein the second modality information is image-based modality.

3. The method of claim 2, wherein the converting of the first and second byte sequences into the first embedding vector and the second embedding vector by applying the embedding technique for each modality includes:
extracting relationship information between objects included in the image by analyzing the second embedding vector; and
reducing a dimension of the second embedding vector based on the relationship information.

4. The method of claim 1, wherein, in the generating of the semantic association information between the first and second modality information by inputting the first and second embedding vectors to the crossmodal transformer, an encoder of the crossmodal transformer generates semantic association information matched between the first and second embedding vectors for each token unit.

5. The method of claim 1, wherein the generating of the semantic association information between the first and second modality information by inputting the first and second embedding vectors to the crossmodal transformer includes:
masking at least one token to be learned as a target by matching with the second modality information among a plurality of tokens included in the first modality information;
collecting at least one language-based third modality information including a token semantically related to the second modality information;
masking the semantically related token in the third modality information as a target; and
generating semantic association information with the second modality information based on the first and third modality information including the masked token.

6. The method of claim 5, wherein the generating of the semantic association information between the first and second modality information by inputting the first and second embedding vectors to the crossmodal transformer includes:
collecting dictionary information corresponding to the masked token of the first modality information;
calculating a similarity between at least one semantic information included in the dictionary information and the masked token; and
including semantic information having the highest similarity among semantic information included in the dictionary information in the training data.

7. The method of claim 6, wherein the semantic information whose similarity is less than a preset threshold is excluded from the training data.

8. An apparatus for generating a language model using crossmodal information, comprising:
a communication unit configured to receive language-based first modality information and non-language-based second modality information;
a memory configured to store a program for learning the language model based on semantic association information between the first and second modality information; and
as the program stored in the memory is executed, a processor configured to convert the first and second modality information into first and second byte sequences, respectively, convert the first and second byte sequences into a first embedding vector and a second embedding vector by applying an embedding technique for each modality, generate semantic association information between first and second modality information by inputting the first and second embedding vectors to a crossmodal transformer, and learn the language model by setting the generated semantic association information as training data.

9. The apparatus of claim 8, wherein the second modality information is image-based modality, and
the processor extracts relationship information between objects included in the image by analyzing the second embedding vector, and reduces a dimension of the second embedding vector based on the relationship information.

10. The apparatus of claim 8, wherein the processor allows an encoder of the crossmodal transformer to generate semantic association information matched between the first and second embedding vectors for each token unit.

11. The apparatus of claim 8, wherein the processor collects at least one language-based third modality information including a token that is semantically related to at least one token to be learned by matching with the second modality information among a plurality of tokens included in the first modality information, and generates semantic association information with the second modality information based on the first and third modality information.

12. The apparatus of claim 11, wherein the processor masks at least one token to be learned as a target by matching with the second modality information among a plurality of tokens included in the first modality information, collects at least one language-based third modality information including a token semantically related to the masked token, masks the corresponding token, and then generates semantic association information with the second modality information based on first and third modality information including the masked token.

13. The apparatus of claim 11, wherein the processor collects dictionary information corresponding to the masked token of the first modality information, calculates a similarity between at least one semantic information included in the dictionary information and the masked token of the first modality information, and then includes semantic information having the highest similarity among semantic information included in the dictionary information in the training data.

14. The apparatus of claim 13, wherein the processor excludes semantic information whose similarity is less than a preset threshold from the training data.

* * * * *